United States Patent
Park et al.

(10) Patent No.: US 10,626,328 B2
(45) Date of Patent: Apr. 21, 2020

(54) NANOCRYSTAL, METHOD OF PREPARING THE SAME, AND OPTOELECTRONIC DEVICE INCLUDING THE NANOCRYSTAL

(71) Applicant: SAMSUNG ELECTRONICS CO., LTD., Suwon-si, Gyeonggi-do (KR)

(72) Inventors: Sungjun Park, Suwon-si (KR); Weonkyu Koh, Suwon-si (KR); Yongnam Ham, Osan-si (KR)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 284 days.

(21) Appl. No.: 15/495,179

(22) Filed: Apr. 24, 2017

(65) Prior Publication Data

US 2018/0142148 A1  May 24, 2018

(30) Foreign Application Priority Data

Nov. 24, 2016 (KR) .................. 10-2016-0157435

(51) Int. Cl.
  *C09K 11/66* (2006.01)
(52) U.S. Cl.
  CPC .......... *C09K 11/668* (2013.01); *C09K 11/665* (2013.01)
(58) Field of Classification Search
  CPC .................. C09K 11/665; C09K 11/668
  See application file for complete search history.

(56) References Cited

U.S. PATENT DOCUMENTS

2015/0228415 A1  8/2015  Seok et al.

FOREIGN PATENT DOCUMENTS

| CN | 105331362 A | 2/2016 |
| CN | 105523581 A | 4/2016 |
| JP | 2015529982 A | 10/2015 |

OTHER PUBLICATIONS

Guhrenz. Solid-State Anion Exchange Reactions for Color Tuning of CsPbX3Perovskite Nanocrystals. Chem. Mater., Nov. 21 2016, 28 (24), pp. 9033-9040.*
Akkerman. Tuning the Optical Properties of Cesium Lead Halide Perovskite Nanocrystals by Anion Exchange Reactions. J. Am. Chem. Soc. 2015, 137, 10276-10281.*
Guangda Niu et al., "Review of recent progress in chemical stability of perovskite solar cells," Journal of Materials Chemistry A, Dec. 3, 2014, pp. 8970-8980, vol. 3.
Parthiban Ramasamy et al., "All-inorganic cesium lead halide perovskite nanocrystals for photodetector applications," Chemical Communications, Dec. 7, 2015, pp. 2067-2070, vol. 52.
Sai Bai et al., "Colloidal metal halide perovskite nanocrystals: synthesis, characterization, and applications," Journal of Materials Chemistry C, Feb. 12, 2016, pp. 3898-3904, vol. 4.

(Continued)

Primary Examiner — Matthew E. Hoban
(74) Attorney, Agent, or Firm — Cantor Colburn LLP

(57) ABSTRACT

A substituted nanocrystal including a nanocrystal represented by Formula 1, wherein a portion of halogen atoms in an outermost region of the nanocrystal is substituted with a chloride anion, a polyatomic anion, or a combination thereof:

$$AMX_3 \qquad \text{Formula 1}$$

wherein, in Formula 1, A is cesium, rubidium, or an ammonium salt;
M is germanium, tin, or lead; and
X is iodine or bromine.

20 Claims, 12 Drawing Sheets

(56) References Cited

OTHER PUBLICATIONS

Samuel D. Stranks et al., "Metal-halide perovskites for photovoltaic and light-emitting devices," Nature Nanotechnology, May 7, 2015, pp. 391-402, vol. 10.

Subham Dastidar et al., "High Chloride Doping Levels Stabilize the Perovskite Phase of Cesium Lead Iodide," Nano Letters, May 2, 2016, pp. 1-24, DOI: 10.1021/acs.nanolett.6b00635.

* cited by examiner

NANOCRYSTAL, METHOD OF PREPARING THE SAME, AND OPTOELECTRONIC DEVICE INCLUDING THE NANOCRYSTAL

CROSS-REFERENCE TO RELATED APPLICATION

This application claims the benefit of and priority to Korean Patent Application No. 10-2016-0157435, filed on Nov. 24, 2016, in the Korean Intellectual Property Office, and all the benefits accruing therefrom under 35 U.S.C. § 119, the content of which is incorporated herein in its entirety by reference.

BACKGROUND

1. Field

The present disclosure relates to a substituted nanocrystal, a method of preparing the substituted nanocrystal, and an optoelectronic device including the substituted nanocrystal.

2. Description of the Related Art

When an iodine-containing compound is used as colloid perovskite quantum dots in an optoelectronic device, the thermal stability and chemical stability of the compound may deteriorate over time. This is an obstacle to practical use of the compound as quantum dots in these devices.

To address these stability issues, aluminum salts have been used in combination with formamidinium metal halides to prepare bulk perovskite crystalline structures. However, this approach is still not satisfactory in terms of thermal stability and chemical stability when applied to colloidal nanocrystals. Therefore, there remains a need for colloidal nanocrystals having improved thermal and chemical stabilities.

SUMMARY

Provided is a substituted nanocrystal with improved stability.

Provided is a method of preparing the substituted nanocrystal.

Provided is an optoelectronic device including the substituted nanocrystal.

Additional aspects will be set forth in part in the description which follows and, in part, will be apparent from the description, or may be learned by practice of the disclosed embodiments.

According to an aspect of an embodiment, there is provided a substituted nanocrystal including a nanocrystal represented by Formula 1, wherein a portion of halogen atoms in an outermost region of the nanocrystal is substituted with a chloride anion (Cl⁻), a polyatomic anion, or a combination thereof:

$$AMX_3 \qquad \text{Formula 1}$$

wherein, in Formula 1, A is cesium (Cs), rubidium (Rb), or an ammonium salt; M is germanium (Ge), tin (Sn), or lead (Pb); and X is iodine (I) or bromine (Br).

According to an aspect of another embodiment, a method of preparing the substituted nanocrystal includes mixing a nanocrystal represented by Formula 1, a nonpolar organic solvent, and an inorganic salt including chloride anion, a polyatomic anion, or a combination thereof:

$$AMX_3 \qquad \text{Formula 1}$$

wherein, in Formula 1, A is cesium (Cs), rubidium (Rb), or an ammonium salt; M is germanium (Ge), tin (Sn), or lead (Pb); and X is iodine (I) or bromine (Br).

According to an aspect of another embodiment, an optoelectronic device includes the above-described substituted nanocrystal that includes the nanocrystal represented by Formula 1, wherein a portion of halogen atoms in an outermost region of the nanocrystal is substituted with a chloride anion, a polyatomic anion, or a combination thereof.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
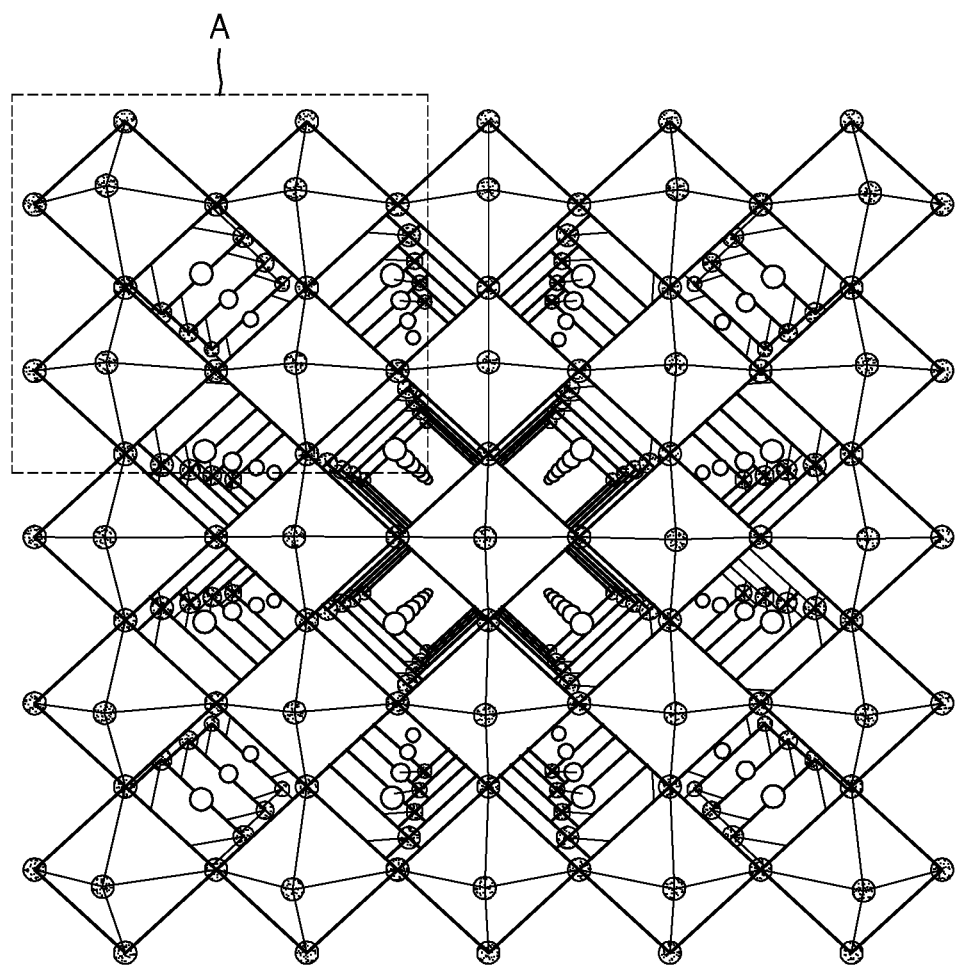
FIG. 1A illustrates a three-dimensional crystal structure of a nanocrystal ($CsPbI_3$) according to an embodiment.

Reference will now be made in detail to embodiments, examples of which are illustrated in the accompanying drawings, wherein like reference numerals refer to like elements throughout. In this regard, the disclosed embodiments may have different forms and should not be construed as being limited to the descriptions set forth herein. Accordingly, the embodiments are described below, by referring to the figures, to explain aspects.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. Expressions such as "at least one of," when preceding a list of elements, modify the entire list of elements and do not modify the individual elements of the list.

In addition, unless explicitly described to the contrary, the word "comprise" and variations such as "comprises" or "comprising", will be understood to imply the inclusion of stated elements but not the exclusion of any other elements.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" is synonymous with "or a combination comprising at least one of the foregoing."

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer or section. Thus, "a first element," "component," "region," "layer," or "section" discussed below could be termed a second element, component, region, layer, or section without departing from the teachings herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

"Group" means a group of the periodic table of the elements according to the International Union of Pure and Applied Chemistry ("IUPAC") 1-18 Group classification system.

Hereinafter, embodiments of a substituted nanocrystal, a method of preparing the same, and an optoelectronic device using the substituted nanocrystal will be disclosed in greater detail.

According to an aspect of an embodiment, there is provided a substituted nanocrystal including a nanocrystal represented by Formula 1, wherein at least one halogen atom, or a portion of halogen atoms in an outermost region of the nanocrystal is substituted with a chloride anion, a polyatomic anion, or a combination thereof:

$$AMX_3 \qquad \text{Formula 1}$$

wherein, in Formula 1, A is cesium (Cs), rubidium (Rb), or an ammonium salt; M is germanium (Ge), tin (Sn), or lead (Pb); and X is iodine (I) or bromine (Br).

The polyatomic anion may be $S_2O_3^{2-}$, $NO_3^-$, $H(PO_4)_2^-$, $H_2PO_4^-$, or a combination thereof.

Thus, as used herein, the term "substituted nanocrystal" refers to a nanocrystal wherein one, or a portion of halogen atoms in an outer most region of the nanocrystal is substituted with another anion, as described above. The term "nanocrystal" refers to an unsubstituted nanocrystal.

The nanocrystal represented by Formula 1 may be a compound represented by Formula 2:

$$AMI_3 \qquad \text{Formula 2}$$

wherein, in Formula 2, A may be cesium (Cs), rubidium (Rb), or an ammonium salt; and M may be germanium (Ge), tin (Sn), or lead (Pb).

The compound represented by Formula 2 may be, for example, $CsGeI_3$, $CsSnI_3$, or $CsPbI_3$.

As used herein, the term "nanocrystal" may refer to a crystal particle having a particle size or diameter of about hundreds of nanometers. The nanocrystal may have, for example, a diameter of about 100 nm or less, for example, a diameter of about 1 nm to 100 nm.

The selective presence of the anion on the surface or the outermost region of the nanocrystal may be identified by ion chromatography and inductively coupled plasma spectroscopy (ICP).

In some embodiments, at least one iodide anion in the outermost region of the nanocrystal may be substituted by a chloride anion (Cl$^-$), a polyatomic anion, or a combination thereof. For example, at least one iodide anion in the outermost region of the nanocrystal may be substituted by a chloride anion.

A structure of a nanocrystal according to an embodiment in which at least one iodide anion present in an outermost region of the nanocrystal is substituted by a chloride anion will now be described with reference to FIGS. 1A to 1C.

Figure 1B:
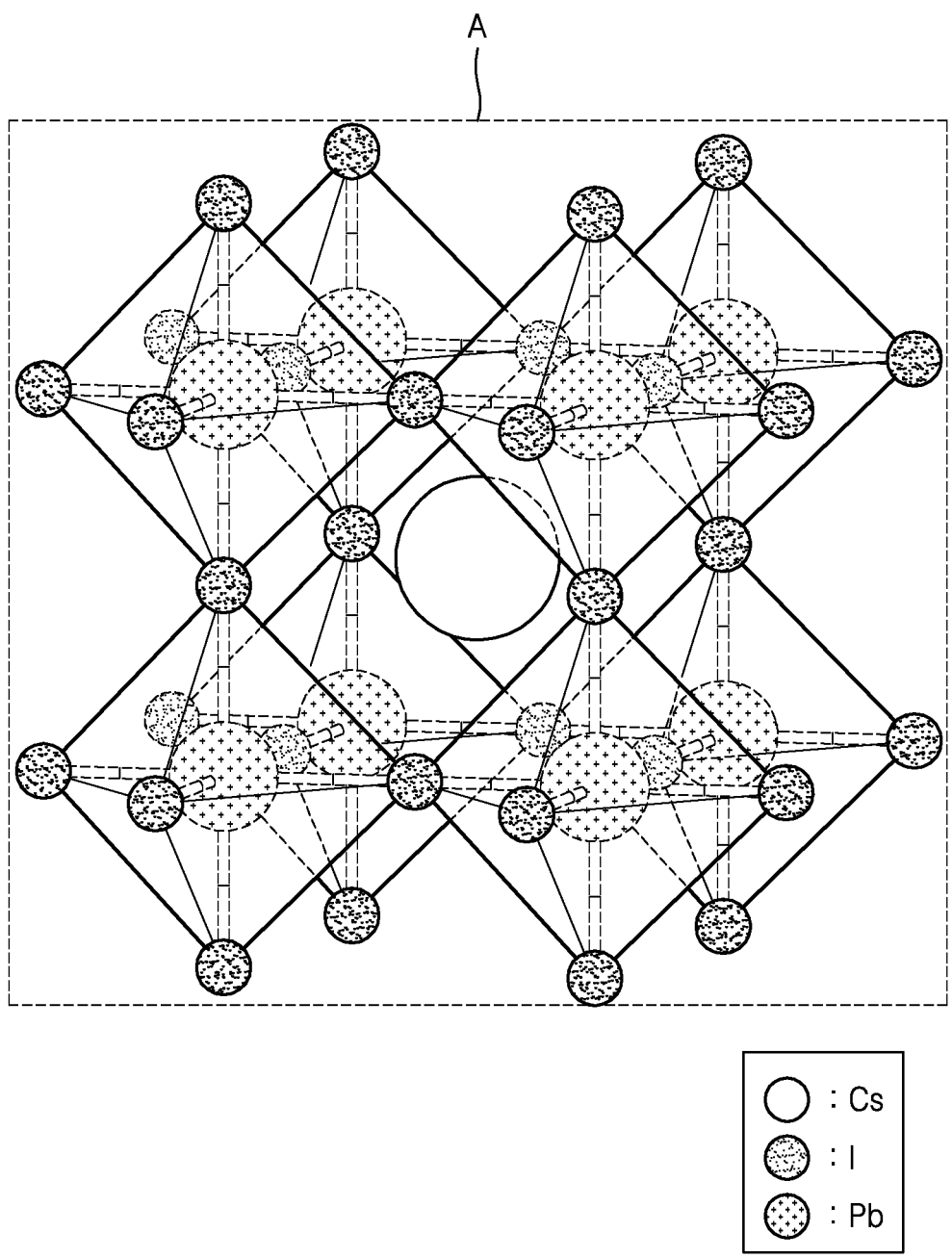
FIG. 1B is an enlarged view of region A in FIG. 1A and shows a unit cell.
Figure 1C:
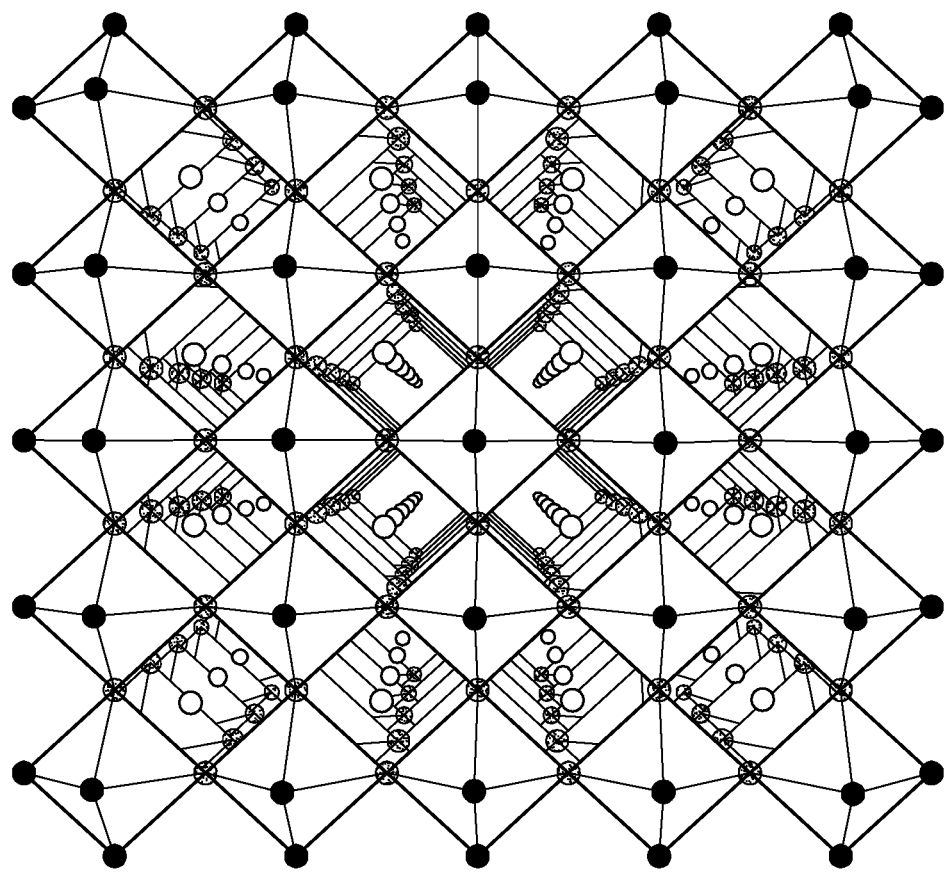
FIG. 1C is a three-dimensional crystal structure of a nanocrystal according to an embodiment.

FIG. 1C is a schematic view of a structure of a chloride anion-substituted nanocrystal according to an embodiment. As an embodiment, a nanocrystal represented by Formula 1, wherein X is iodine (I), will be described.

In some embodiments, the nanocrystal may include a crystalline structure with a repeating pattern of a single lattice of the perovskite $AMI_3$, as illustrated in FIGS. 1A and 1B. In the formula of $AMI_3$, A may be Cs, and M may be Pb. Without being bound to theory, in the nanocrystal having such a crystalline structure, iodide anions present in an outermost region are relatively unstable with respect to Cs and Pb, and thus the nanocrystal is highly prone to decomposition. Thus, stability of the nanocrystal is considerably affected by iodide anions in the outermost region of the nanocrystal. Accordingly, the present inventors have found that the stability of the nanocrystal may be improved by substitution of at least one iodide anion, for example, all of the iodide anions present in the outermost region of the nanocrystal, with an anion, for example, a chloride anion, as illustrated in FIG. 1C, through surface modification of the nanocrystal. Through the modification of an outermost region, preferably only an outermost region of such a nanocrystal, the substituted nanocrystal may have improved stability and exhibit intrinsic optical characteristics of $AMI_3$. For example, in a nanocrystal represented by the formula of $CsPbI_3$, when an iodide anion in an outermost region of the nanocrystal is substituted with a chloride anion, the nanocrystal may have an emission wavelength of about 500 nanometers (nm) to about 750 nm.

As used herein, the "outermost region" may refer to a surface of a nanocrystal.

In some embodiments, when the nanocrystal represented by Formula 1, for example $CsPbI_3$, has at least one iodide anion in the outermost region that is substituted with an anion that is $Cl^-$, $SO_3^-$, $NO_3^-$, $H(PO_4)_2^-$, $H_2PO_4^-$, or a combination thereof, the substituted nanocrystal may be represented by one of Formulae 3 to 6:

$$CsPbI_xCl_{3-x} \quad \text{Formula 3}$$

wherein, in Formula 3, 2.94≤x<3, $$CsPbI_x(SO_3)_{3-x} \quad \text{Formula 4}$$

wherein, in Formula 4, 2.94≤x<3, $$CsPbI_x(H(PO_4)_2)_{3-x} \quad \text{Formula 5}$$

wherein, in Formula 5, 2.94≤x<3, $$CsPbI_x(H_2PO_4)_{3-x} \quad \text{Formula 6}$$

wherein, in Formula 6, 2.94≤x<3,
or a combination thereof.

The amount of the anion may be about 0.55 weight percent (wt %) or less, for example, about 0.0001 wt % to about 0.5 wt %, based on a total weight of the substituted nanocrystal.

The substituted nanocrystal represented by Formula 3 ($CsPbI_xCl_{3-x}$) may be, for example, $CsPbI_{2.94}Cl_{0.06}$, $CsPbI_{2.97}Cl_{0.03}$, or the like.

In some embodiments, the substituted nanocrystal may have an emission wavelength of about 600 nm to about 750 nm. Accordingly, the nanocrystal in which at least one iodine anion in the outermost region is substituted with an anion (i.e., the substituted nanocrystal), for example, a chloride anion, may have substantially the same emission wavelength and spectroscopic data as those of a nanocrystal without such a substitution.

In some embodiments, other ions unrelated to the inherent spectrum of the nanocrystal, in addition to atoms related to the inherent nanocrystal spectrum, may be detected from the nanocrystal by ion chromatography analysis. The detected amount of the atoms related to the inherent nanocrystal spectrum may be about 4 times or greater than that of added anions.

In some embodiments, the amount of iodide anions in the substituted nanocrystal after 240 minutes may be increased by about 2.83 times or less relative to the amount of iodide anions after 30 minutes, as analyzed by ion chromatography. For example, the amount of iodide anions in the substituted nanocrystal may be about 0.9769 parts per million (ppm) or less after 30 minutes and may be about 2.7719 ppm or less after 240 minutes.

In some embodiments, as analyzed by ion chromatography, the amount of chloride anions in the substituted nanocrystal may be about 0.2555 ppm or less after 30 minutes, and may be about 0.4744 ppm or less after 240 minutes. At this time, the amount of Cs in the substituted nanocrystal may be about 0.176 ppm or less after 30 minutes, and may be about 0.2562 ppm or less after 240 minutes. The amount of iodide anions in the substituted nanocrystal may be about 0.9769 ppm or less after 30 minutes, and may be about 2.7719 ppm or less after 240 minutes. When such a sustained increase in the amount of each of the different ions released from the substituted nanocrystal over time is reduced, it indicates that the substituted nanocrystal may have remarkably improved stability.

Hereinafter, a method of preparing a substituted nanocrystal according to an embodiment will now be described. This method is a method of stabilizing the nanocrystal by minimizing decomposition of the nanocrystal.

According to an embodiment, the method of preparing the substituted nanocrystal may include mixing a nanocrystal represented by Formula 1, a nonpolar organic solvent, and an inorganic salt including an anion that is a chloride anion, polyatomic anion, or a combination thereof:

$$AMX_3 \quad \text{Formula 1}$$

wherein, in Formula 1, A may be cesium (Cs), rubidium (Rb), or an ammonium salt; M may be germanium (Ge), tin (Sn), or lead (Pb); and X may be iodine (I) or bromine (Br).

The inorganic salt may be, for example, an inorganic salt including a chloride anion, or an inorganic salt including an anion that is $S_2O_3^{2-}$, $NO_3^-$, $H(PO_4)_2^-$, $H_2PO_4^-$, or a combination thereof.

For example, the inorganic salt including an anion that is $S_2O_3^{2-}$, $NO_3^-$, $H(PO_4)_2^-$, and $H_2PO_4^-$ may include an anion selected from $S_2O_3^{2-}$, $NO_3^-$, $H(PO_4)_2^-$, $H_2PO_4^-$, or a combination thereof; and a cation that is an alkali metal cation, a Group 12 metal cation, or a combination thereof. For example, the Group 12 metal cation may be a Zn cation.

The inorganic salt may be, for example, LiCl, $Na_2(S_2O_3)$, NaCl, $NaNO_3$, $Na_2SO_4$, $NaH(PO_4)_2$, $NaH_2PO_4$, $ZnCl_2$, or a combination thereof.

The nonpolar organic solvent used may be that in which the inorganic salt has a suitable degree of solubility. In an embodiment, the suitable degree of solubility of the inorganic salt in the nonpolar organic solvent may refer to the amount of the inorganic salt that is sufficient to saturate the nonpolar organic solvent. In another embodiment, the suitable degree of solubility may refer to the amount of inorganic salt in the nonpolar organic solvent that is suitable for the method of preparing the substituted nanocrystal from the nanocrystal represented by Formula 1. The amount of the inorganic salt that may be soluble in the nonpolar organic solvent may be about 0.0000001 wt % to about 2 wt %, and in some embodiments, about 0.0000001 wt % to about 1 wt %, and in some other embodiments, about 0.0000001 wt % to about 0.01 wt %, based on a total weight of the nonpolar organic solvent and the inorganic salt. When the nonpolar organic solvent offers such solubility characteristics within these ranges, at least one halogen anion in the outermost region of the nanocrystal of Formula 1 may be effectively substituted with the anion(s) of the inorganic salt.

For example, the mixing of the nanocrystal represented by Formula 1, the nonpolar organic solvent, and the inorganic salt may include: adding the inorganic salt including an anion as described above, for example, an iodide anion, to the nonpolar organic solvent and mixing a resulting mixture to obtain an inorganic salt mixture; and contacting the nanocrystal represented by Formula 1 with the inorganic salt mixture, and optionally further mixing. In some embodiments, the inorganic salt mixture is mixed until the inorganic salt is dissolved, for example to saturation, in the nonpolar organic solvent.

In some embodiments, the adding of the inorganic salt to the nonpolar organic solvent and mixing the resulting mixture is a process of saturating the inorganic salt in the nonpolar organic solvent, in which the inorganic salt has a suitable degree of solubility, to a concentration of about 0.0000001 wt % to about 0.01 wt %, for example, about 0.0000001 wt % to about 0.01 wt %, based on a total weight of the nonpolar organic solvent and the inorganic salt. When such an inorganic salt including an anion that is $S_2O_3^{2-}$, $NO_3^-$, $H(PO_4)_2^-$, $H_2PO_4^-$, or a combination thereof, is added to the nonpolar organic solvent, the inorganic salt may become saturated in the nonpolar organic solvent at a suitable concentration. The maximum amount of the inorganic salt soluble in the nonpolar organic solvent may be about 0.01 wt % or less, for example, about 0.000001 wt % to about 0.01 wt %, based on a total weight of the nonpolar organic solvent and the inorganic salt.

The nonpolar organic solvent may be, for example, pentane, hexane, heptane, isooctane, cyclohexane, toluene, benzene, xylene, N,N-dimethylformamide, or a combination thereof. In some embodiments, the nonpolar organic solvent may be hexane, toluene, or dimethylformamide.

The amount of the inorganic salt may be about 0.5 parts by weight or less, for example, about 0.0001 parts to about 0.5 parts by weight, based on 100 parts by weight of the nanocrystal represented by Formula 1. When the amount of the inorganic salt is within these ranges, the substituted nanocrystal may have markedly improved stability.

The contacting of the nanocrystal represented by Formula 1 to the inorganic salt mixture, and optionally mixing the resulting mixture, may be performed at room temperature (about 25° C.) for about 0.5 hours to about 3 hours, for example, for about 1 hour. However, embodiments are not limited thereto.

When about 0.1 wt % of an inorganic salt, based a total weight of the nanocrystal, is further added to the mixture of the nanocrystal represented by Formula 1 and the inorganic salt mixture and left to sit for a while, a precipitate of the inorganic salt and nanocrystal impurities may appear on the bottom of a container containing the mixture. The supernatant may be separated from the precipitate to obtain the substituted nanocrystal according to an embodiment.

As described above, the method of preparing a substituted nanocrystal according to any one of the embodiments may effectively improve stability of the nanocrystal without time consumption.

The nanocrystal represented by Formula 1 according to any one of the embodiments may be prepared, for example using a known method in the art. According to an embodiment, the nanocrystal represented by Formula 1 according to any of the embodiments may be prepared using the following method. However, embodiments are not limited thereto.

First, a metal halide including Ge, Sn, Pb, or a combination thereof is mixed with a first solvent, and the resulting mixture may be dried.

The drying may be performed under vacuum conditions at about 80° C. to about 150° C.

The first solvent may be, for example, 1-octadecene, 1-decene, 1-undecene, 1-dodecene, 1-tetradecene, 1-hexadecene, 1-eicosene, or a combination thereof. The amount of the first solvent may be about 100 parts to about 3,000 parts by weight, based on 100 parts by weight of a total weight of an organic acid, and a metal halide.

The organic acid includes a cesium (Cs) salt, a rubidium (Rb) salt, an ammonium salt, or a combination including at least one of the foregoing, and may be, for example, cesium oleic acid or rubidium oleic acid. The metal halide may be lead iodide ($PbI_2$), lead bromide ($PbBr_2$), germanium iodide ($GeI_2$), germanium bromide ($GeBr_2$), tin iodide ($SnI_2$), tin bromide ($SnBr_2$), or a combination thereof.

Next, a surfactant and the organic acid may be added to the dried mixture, then mixed together, and then thermally treated.

The thermal treatment may be performed at a temperature of about 100° C. to about 200° C., for example, a temperature of about 120° C. to about 150° C.

A resulting product of the thermal treatment may be cooled down to room temperature (about 25° C.), and then purified by, for example, centrifugation, to obtain a target product.

The surfactant may be any suitable compound used as a surfactant, including those available in the art. For example, the surfactant may be a $C_1$-$C_{18}$ carboxylic acid, a $C_3$-$C_{18}$ alkyl amine, a $C_1$-$C_{18}$ alcohol, or a mixture thereof.

The $C_1$-$C_{18}$ carboxylic acid may be oleic acid, octanoic acid, stearic acid, or decanoic acid. The $C_1$-$C_{18}$ alkyl amine may be oleylamine, octylamine, hexadecylamine, octadecylamine, or tri-n-octylamine. The $C_1$-$C_{18}$ alcohol may be oleyl alcohol, octanol, or butanol.

In some embodiments, the surfactant may be oleylamine, oleic acid, or a combination thereof. The amount of the surfactant may be a suitable amount, for example an amount used in the art.

The substituted nanocrystal according to some embodiments may be a colloidal perovskite quantum dot. The colloidal perovskite quantum dot may be used in a core-shell, alloy, or doped structure. The colloidal perovskite quantum dot may be effectively used in a light-emitting device as a material for color tuning.

The colloidal perovskite quantum dot may be used in a perovskite solar cell, a light-receiving device, a light-emitting diode (LED), a laser, or the like, which may ensure a solution process has efficiency of 20% or greater.

In some embodiments, the structure of the substituted nanocrystal may be identified by X-ray photoelectron spectroscopy (XPS), energy-dispersive X-ray spectroscopy (EDX), inductively coupled plasma spectroscopy (ICP), and/or gravimetric analysis.

In some embodiments, the substituted nanocrystal may be used in an optoelectronic device.

Optoelectronic devices, which use photoelectric characteristics of semiconductors, include devices for converting electrical energy to optical energy, and devices for converting optical energy to electrical energy. Devices for converting electrical energy to optical energy include luminous devices or light-emitting devices such as a light-emitting diode (LED) and a laser diode (LD). Devices for converting optical energy to electrical energy include a solar cell and a photodiode.

Figure 7:
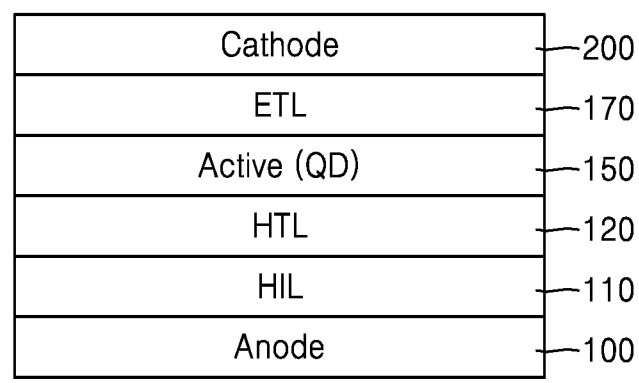
FIG. 7 is a cross-sectional view of an optoelectronic device including a nanocrystal according to an embodiment.

FIG. 7 is a cross-sectional view of an optoelectronic device including a nanocrystal according to one of the above-described embodiments as colloidal perovskite quantum dots.

Referring to FIG. 7, an optoelectronic device according to an embodiment may include an anode 100, and a cathode 200 separated from the anode 100. The anode 100 and the cathode 200 may also be referred to as a first electrode and a second electrode, respectively. The anode 100 may be formed of a transparent electrode material, for example, indium tin oxide (ITO), or other materials, for example, Al, Ag, Au, carbon nanotubes (CNTs), or graphene. The cathode 200 may be formed of, for example, Al, Mo, Ag, Au, Ca, Ba, ITO, CNTs, or graphene. However, materials for forming the anode 100 and the cathode 200 are not limited to the above-listed example materials. For example, the anode 100 and the cathode 200 may be formed of any of a variety of metals or conductive compounds, such as oxides.

An active layer 150 may be between the anode 100 and the cathode 200. The active layer 150 may include a quantum dot.

The quantum dot of the active layer 150 may be obtained using, for example, a colloidal solution. The quantum dot may be a nanocrystal according to any of the above-described embodiments. The quantum dot may be, for example, a colloidal quantum dot.

An electron transport layer 170 ("ETL" in FIG. 7) may be between the active layer 150 and the cathode 200. The electron transport layer 170 may include an inorganic semiconductor. The inorganic semiconductor may be an n-type semiconductor. The inorganic semiconductor may be formed from an oxide or a non-oxide. The oxide may be, for example, one of a zinc oxide (ZnOx), a titanium oxide (TiOx), a tin oxide (SnOx), and a zirconium oxide (ZrOx), or a combination of at least two thereof. The zinc oxide may be ZnO. The titanium oxide may be $TiO_2$. The tin oxide may be $SnO_2$. The zirconium oxide may be $ZrO_2$. The non-oxide may be, for example, n-GaN. The above-listed inorganic semiconductor materials are provided as non-limiting examples, and various other inorganic semiconductor materials may be used. When the electron transport layer 170 is formed of an inorganic semiconductor, it may be more effective to implement the electron transport layer 170 having high efficiency, as compared to when an organic semiconductor is used. However, the material of the electron transport layer 170 is not limited to inorganic semiconductor materials. For example, the electron transport layer 170 may in some cases be formed of an n-type organic semiconductor.

The electron transport layer 170 may have a thin film shape or may have a layered structure including a plurality of nanostructures. The plurality of nanostructures may be, for example, nanoparticles. The electron transport layer 170 may be amorphous or polycrystalline. For example, the electron transport layer 170 may in some cases have a mixed phase of amorphous and polycrystalline phases. When the electron transport layer 170 is formed of an inorganic semiconductor, the electron transport layer 170 may have a comparatively large number of dangling bonds on a surface thereof. In this regard, the electron transport layer 170 may have a comparatively high surface charge density.

In some embodiments, by including the quantum dots as described above, the optoelectronic device may be implemented as a quantum dot-containing optoelectronic device having good performance, improved photoelectric conversion efficiency, improved durability, and improved stability A hole transport layer ("HTL" in FIG. 7) 120 may further be disposed between the active layer 150 and the anode 100. In some embodiments, the hole transport layer 120 is optional, and may be omitted.

The hole transport layer 120 may include an organic semiconductor. The organic semiconductor may be a p-type semiconductor. The organic semiconductor may include a low-molecular weight organic material or a high-molecular weight organic material. For example, the organic semiconductor may include poly(9,9-dioctylfluorene-co-N-(4-butylphenyl)diphenylamine) (TFB), 4,4'-bis(9H-carbazol-9-yl) biphenyl (CBP), N,N'-bis(3-methylphenyl)-N,N'-diphenylbenzidine (TPD), poly-TPD, poly(N-vinylcarbazole) (PVK), tris(4-carbazoyl-9-ylphenyl)amine (TCTA), N,N'-di(1-naphthyl)-N,N'-diphenyl-(1,1'-biphenyl)-4,4'-diamine (NPD), poly(9,9-dioctylfluorene-co-bis-N,N'-(4-butylphenyl)-bis-N,N'-phenyl-1,4-phenylenediamine) (PFB), poly(9,9-dioctylfluorene-co-bithiophene) (F8T2), or a combination thereof.

However, the above-listed materials for forming the hole transport layer 120 are provided as non-limiting examples. Various other materials may be used as materials of the hole transport layer (120). For example, the hole transport layer 120 may in some cases be formed of an inorganic semiconductor, for example, a p-type inorganic semiconductor.

When the hole transport layer 120 is formed of an organic semiconductor, the hole transport layer 120 may directly contact the active layer 150. Even when the hole transport layer 120 directly contacts the active layer 150, this may ensure comparatively good interfacial characteristics between the hole transport layer 120 and the active layer 150 and may implement a high-efficiency optoelectronic device. However, as described above, the hole transport layer 120 may also include an inorganic semiconductor. In this case, a molecular layer (not shown, as a second molecular interfacial layer) may further be between the hole transport layer 120 and the active layer 150. Even when the hole transport layer 120 includes an organic semiconductor, a molecular layer (not shown, as a second molecular interfacial layer) may further be between the hole transport layer 120 and the active layer 150.

A hole injection layer 110 ("HIL" in FIG. 7) may further be disposed between the hole transport layer 120 and the anode 100. The hole injection layer 110 may include an organic semiconductor or an inorganic semiconductor. For example, the hole injection layer 110 may include an organic semiconductor, such as poly(3,4-ethylenedioxythiophene) (PEDOT) or poly(3,4-ethylenedioxythiophene):polystyrene sulfonate (PEDOT:PSS).

The hole injection layer 110 may include an organic semiconductor such as $MoO_3$, NiO, or $WO_3$. However, the above-listed materials for forming the hole injection layer 110 are provided as non-limiting examples. Various other materials may be used as materials for forming the hole injection layer 110. For example, any hole-injecting materials commonly used in the field of optoelectronic devices may be used as materials of the hole injection layer 110. When the hole injection layer 110 has high electrical conductivity, the hole injection layer 110 may be regarded as a part of the anode 100. In this case, the hole injection layer 110 may be omitted. In this case, the hole transport layer 120 may also serve as the hole injection layer 110.

In some embodiments, the substituted nanocrystal may be used in a solar cell, a light-emitting apparatus, or a light-emitting device, such as a laser, as well as in an optoelectronic device as described above.

One or more embodiments of the present disclosure will now be described in detail with reference to the following examples. However, these non-limiting examples are for illustrative purposes and are not intended to limit the scope of the one or more embodiments of the present disclosure.

EXAMPLES

Comparative Example 1

Preparation of Nanocrystal $CsPbI_3$ 5 milliliters (mL) of 1-octadecene and 0.067 grams (g) of lead iodide ($PbI_2$) were mixed together to obtain a mixture.

This mixture was dried under vacuum at about 100° C., and then 0.5 mL of oleic acid and 0.5 mL of oleylamine were added thereto and mixed together under a nitrogen atmosphere at about 120° C.

When the mixture reached a homogeneous state, the mixture was heated to about 150° C., and 0.5 mL of a 0.125 molar (M) solution of cesium oleic acid in 1-octadecene was rapidly added to the mixture. The resulting reaction mixture was cooled down to room temperature (about 25° C.) and purified by centrifugation, to thereby obtain a nanocrystal ($CsPbI_3$).

Example 1

Preparation Method of Substituted Nanocrystal 1 mL of hexane and 0.012 milligrams (mg) of lithium chloride (LiCl) were mixed for about 30 minutes to prepare an inorganic salt solution. The amount of hexane in the inorganic salt solution was about 99.9988 wt %, and the amount of lithium chloride was about 0.0012 wt %, based on the total weight of hexane and lithium chloride.

10 mg of the nanocrystal ($CsPbI_3$) prepared in Comparative Example 1 was added to 1 g of the inorganic salt solution, and then mixed together for about 1 hour to obtain a substituted nanocrystal in which at least a portion of the iodide anions in an outermost region of the nanocrystal were substituted with chloride anions. The amount of the chloride anions was about 0.1 wt %, based on a total weight of the substituted nanocrystal.

Example 2

A substituted nanocrystal in which at least a portion of the iodide anions in an outermost region of the nanocrystal were substituted with chloride anions was obtained in the same manner as in Example 1, except that 0.016 mg of sodium chloride (NaCl) was used instead of 0.012 mg of lithium chloride. The amount of the chloride anions was about 0.1 wt %, based on a total weight of the substituted nanocrystal.

Example 3

A substituted nanocrystal in which at least a portion of the iodide anions in an outermost region of the nanocrystal were substituted with sulfite anions was obtained in the same manner as in Example 1, except that 0.044 mg of sodium sulfite ($Na_2(S_2O_3)$) was used instead of 0.012 mg of lithium chloride. The amount of the sulfite anions was about 0.52 wt %, based on a total weight of the substituted nanocrystal.

Example 4

A substituted nanocrystal in which at least a portion of the iodide anions in an outermost region of the nanocrystal were substituted with nitrite anions was obtained in the same manner as in Example 1, except that 0.024 mg of sodium nitrite ($NaNO_3$) was used instead of 0.012 mg of lithium chloride. The amount of the nitrite anions was about 0.29 wt %, based on a total weight of the substituted nanocrystal.

Example 5

A substituted nanocrystal in which at least a portion of the iodide anions in an outermost region of the nanocrystal were substituted with chloride anions was prepared in the same manner as in Example 1, except that 1 mL of toluene was used instead of 1 mL of hexane. The amount of the chloride anions was about 0.1 wt %, based on a total weight of the substituted nanocrystal.

Example 6

A substituted nanocrystal in which at least a portion of the iodide anions in an outermost region of the nanocrystal were substituted with chloride anions was prepared in the same manner as in Example 1, except that the amounts of lithium chloride and hexane were adjusted to obtain the nanocrystal including about 0.0001 wt % of chloride anions, based on a total weight of the substituted nanocrystal.

Example 7

A substituted nanocrystal in which at least a portion of the iodide anions in an outermost region of the nanocrystal were substituted with chloride anions was prepared in the same manner as in Example 1, except that the amounts of lithium chloride and hexane were adjusted to obtain the nanocrystal including about 0.5 wt % of chloride ions anions based on a total weight of the nanocrystal.

Comparative Example 2

A comparative nanocrystal was prepared in the same manner as in Example 1, except that methanol was used instead of hexane.

Comparative Example 3

A nanocrystal blend was prepared by mixing 98 wt % of a first nanocrystal ($CsPbI_3$) and 2 wt % of a second nanocrystal ($CsPbCl_3$).

Evaluation Example 1

Stability Test

1) Example 1 and Comparative Example 1

A stability test was performed on the substituted nanocrystal prepared in Example 1 and the comparative nanocrystal prepared in Comparative Example 1.

The stability test was performed by measuring amounts of Cs ions and I ions detected over time in a decomposition product of the substituted and comparative nanocrystals by ion chromatography using a Dionex ICS-5000+ HPIC ion chromatography system (available from Thermoscientific, San Jose, Calif.). Details of this method are as follows.

5 mg of the substituted or comparative nanocrystal was dispersed in 500 microliters (μL) of hexane, and 500 μL of deionized water was added thereto to remove free ions that were generated as a decomposition product of the substituted or comparative nanocrystal.

250 μL of the resulting solution from which free ions were removed was taken with a 500-μL injector (having an inner diameter of about 2 mm, Hamilton), and 250 μL of deionized water was added into the injector to form a microinterface between the hexane solution including the substituted or comparative nanocrystal, and the deionized water, thus allowing migration of the ions at the microinterface, resulting from the decomposition of the substituted or comparative nanocrystal, to the aqueous phase (deionized water).

Next, 50 μL of the aqueous phase was collected to analyze the decomposed ions from the substituted or comparative nanocrystal. The collected decomposition product of the substituted or comparative nanocrystal was analyzed by ion chromatography, immediately after the collection of the aqueous phase, and 30 minutes, 50 minutes, 120 minutes, and 240 minutes after the collecting.

Figure 2A:
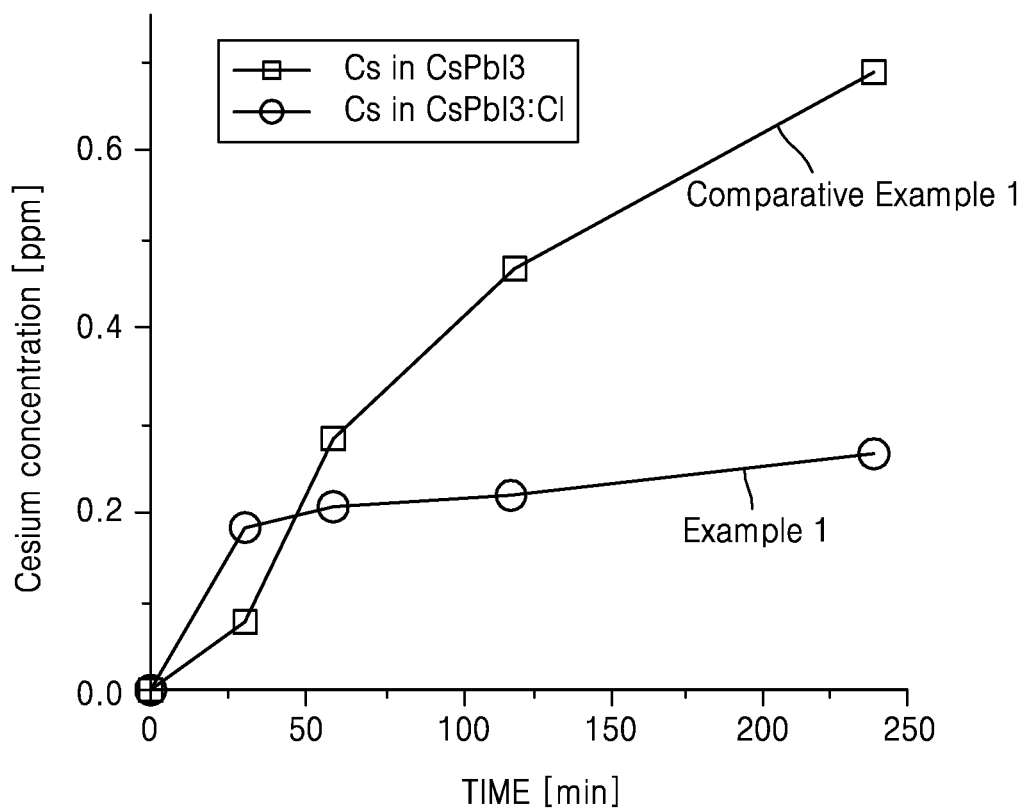
FIG. 2A is a graph of cesium concentration (parts per million, ppm) versus time (minutes, min), illustrating results of a stability test by ion chromatography of nanocrystals of Example 1 and Comparative Example 1.
Figure 2B:
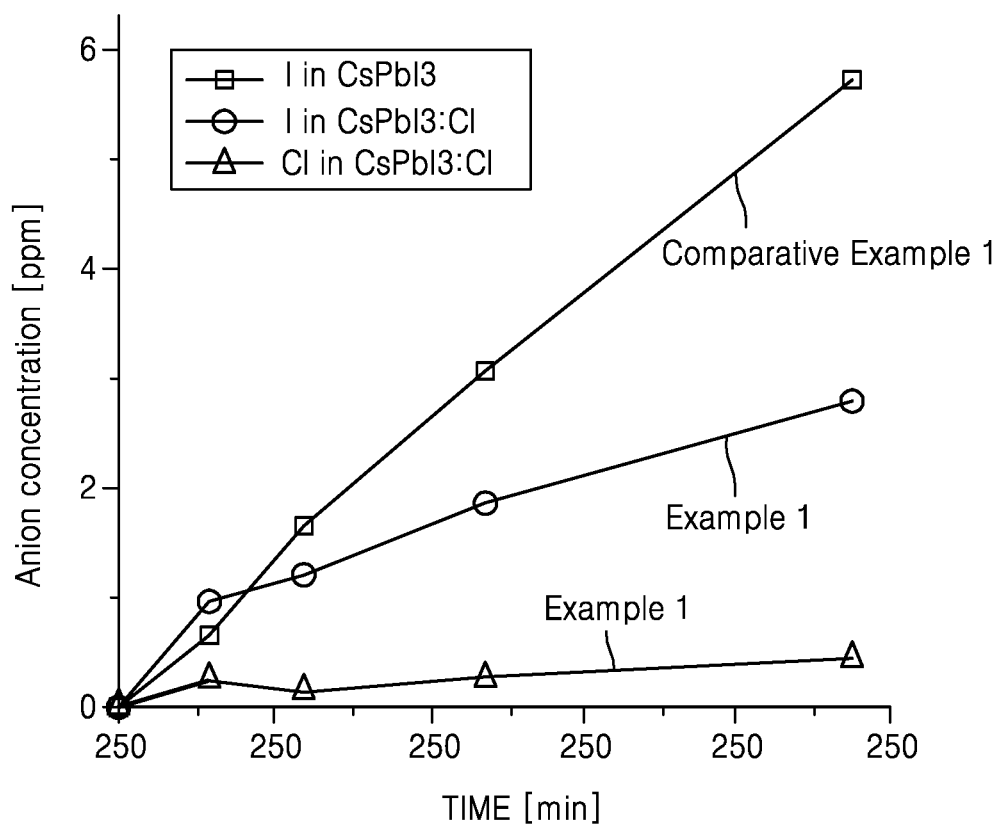
FIG. 2B is a graph of anion concentration (ppm) versus time (min), illustrating results of a stability test by ion chromatography of nanocrystals of Example 1 and Comparative Example 1.
Figure 3A:
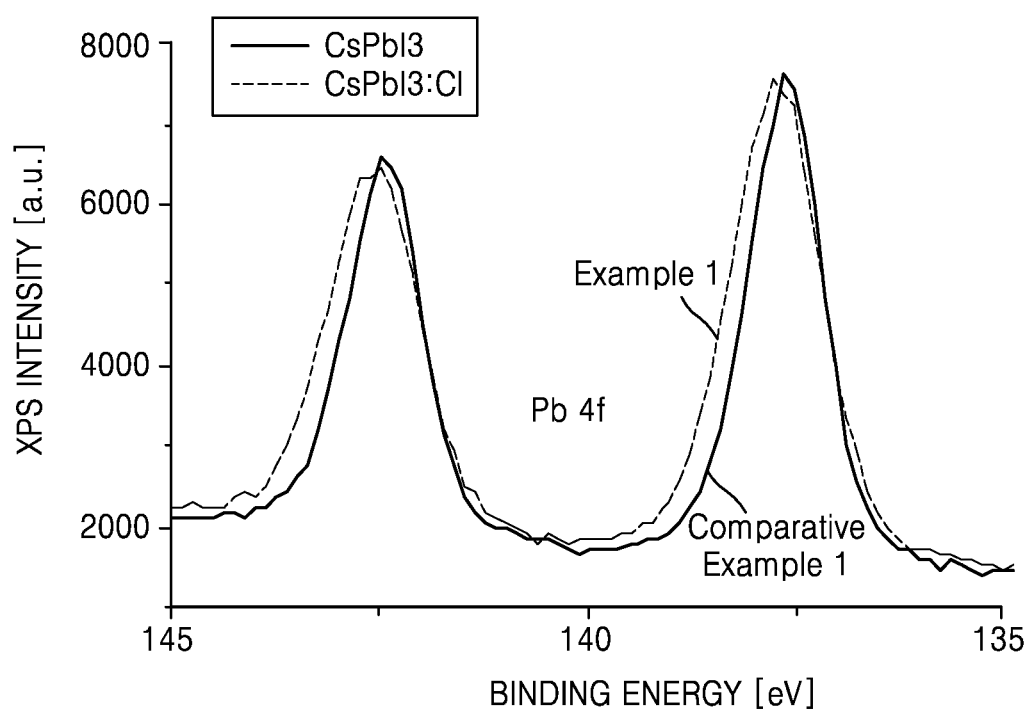
FIGS. 3A, 3B, 3C, and 3D are each graphs of intensity (arbitrary units, a.u.) versus binding energy (electron volts, eV), illustrating results of X-ray photoelectron spectroscopy (XPS) of the nanocrystals of Example 1 and Comparative Example 1.
Figure 3B:
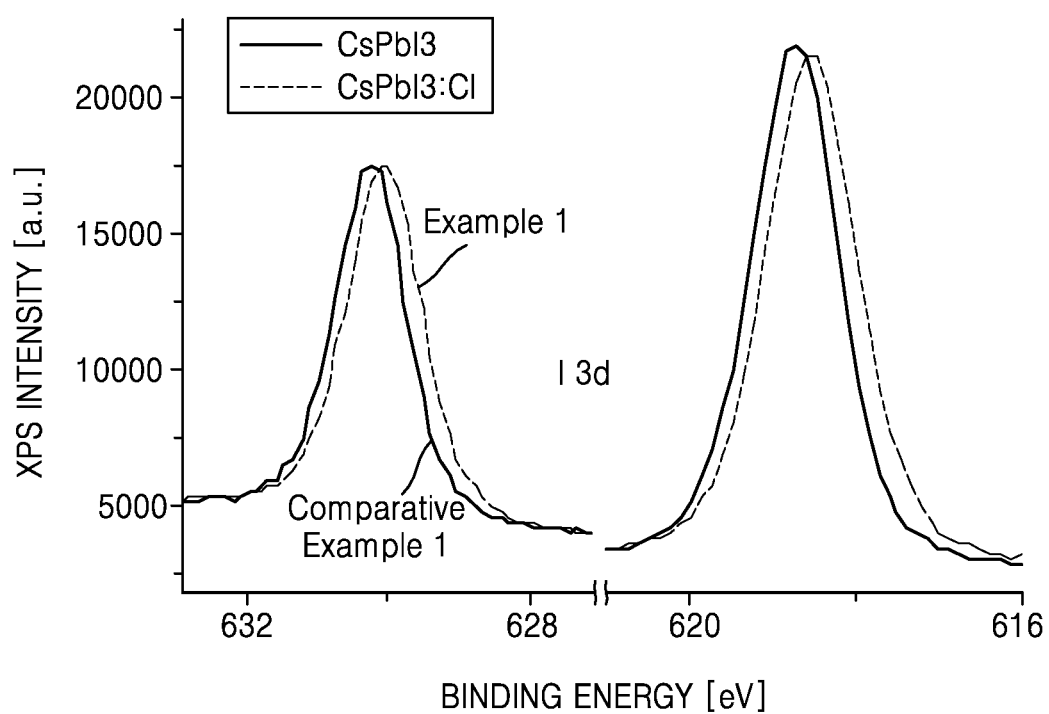
Figure 3C:
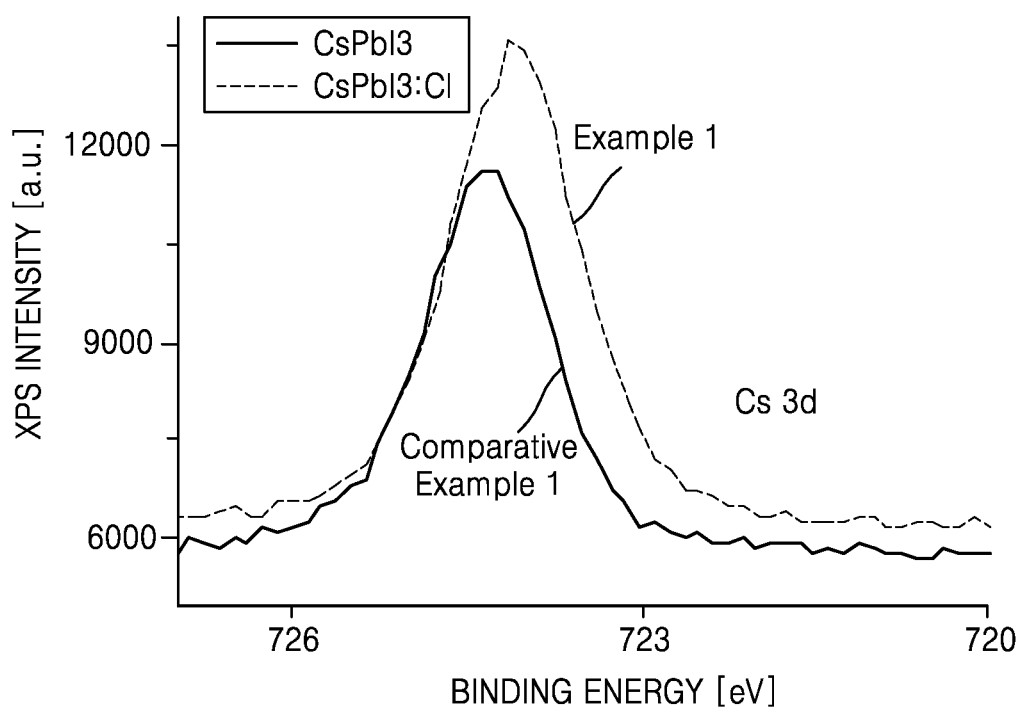
Figure 3D:
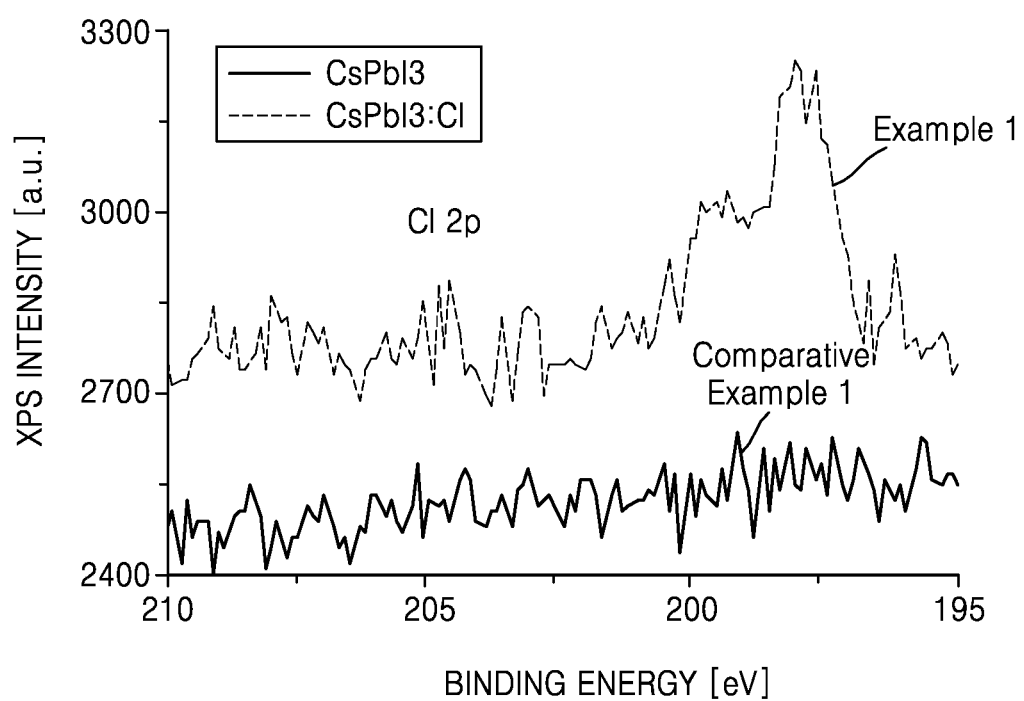

The stability test results of the substituted and comparative nanocrystals of Example 1 and Comparative Example 1, respectively, are shown in Table 1, and FIGS. 2A and 2B.

TABLE 1

| Time (min) | Example 1 | | | Comparative Example 1 | |
| --- | --- | --- | --- | --- | --- |
| | Cs (ppm) | I (ppm) | Cl (ppm) | Cs (ppm) | I (ppm) |
| 0 | 0 | 0 | 0 | 0 | 0 |
| 30 | 0.176 | 0.9769 | 0.2555 | 0.0751 | 0.6776 |
| 60 | 0.2028 | 1.1533 | 0.1825 | 0.2788 | 1.6704 |
| 120 | 0.2128 | 1.9198 | 0.292 | 0.4623 | 3.1271 |
| 240 | 0.2562 | 2.7719 | 0.4744 | 0.6789 | 5.8327 |

Referring to Table 1 and FIGS. 2A and 2B, the concentration of Cl in the comparative nanocrystal of Comparative Example 1 did not change with time, while the concentration of Cl in the substituted nanocrystal of Example 1 changed as a result of decomposition of the substituted nanocrystal. In the substituted nanocrystal of Example 1, having a repeating pattern of a single lattice as illustrated in FIG. 1C, a relatively large amount of Cl, which originates from chloride anions present in the outermost region as a result of decomposition of the substituted nanocrystal, was detected at an early stage. The detected amount of Cl was reduced at 60 minutes, but increased again with time.

The amount of iodide anions detected from the comparative nanocrystal of Comparative Example 1 after 240 minutes increased by about 8.6 times relative to that detected after 30 minutes, while the amount of iodide anions detected from the substituted nanocrystal of Example 1 after 240 minutes increased by about 2.83 times relative to that detected after 30 minutes. This reduced increase in the amount of iodide anions detected from the substituted nanocrystal of Example 1 over time, relative to that of the comparative nanocrystal of Comparative Example 1, indicates that the substituted nanocrystal of Example 1 had improved stability. In other words, the substitution of a portion of the iodide anions from the outer most region of the nanocrystal with chloride anions improved the stability of the resultant substituted nanocrystal.

Considering that spectroscopic data of the substituted nanocrystal of Example 1 to be described below with reference to FIGS. 3A to 3D and FIGS. 5 and 6 was not changed after the stability test, the substituted nanocrystal of Example 1 was found to still retain chloride anions in the surface region of the substituted nanocrystal.

A stability test of the substituted nanocrystals of Examples 2 to 7 was performed in the same manner as the above-described stability test performed on the substituted nanocrystal of Example 1.

As a result of the stability tests, the substituted nanocrystals of Examples 2 to 7 were found to have nearly equal stability with the substituted nanocrystal of Example 1.

1) Examples 2 to 4 and Comparative Example 1

A stability test of the substituted nanocrystals of Examples 2 to 4 and the comparative nanocrystal of Comparative Example 1 was performed in the same manner as the above-described stability test performed on the substituted nanocrystal of Example 1, except that the amount of iodine ions was measured by ion chromatography after 12 hours.

The stability test results of the substituted and comparative nanocrystals of Examples 2 to 4 and Comparative Example 1, respectively, are shown in Table 2.

TABLE 2

| Example | I (ppm) |
| --- | --- |
| Example 2 | 0.033 |
| Example 3 | 0.032 |
| Example 4 | 0.033 |
| Comparative Example 1 | 0.036 |

Referring to Table 2, the detected amounts of iodide anions in the substituted nanocrystals of Examples 2 to 4 were each smaller than the amount of iodide anions in the comparative nanocrystal of Comparative Example 1, indicating that the substituted nanocrystals of Examples 2 to 4 had improved stability relative to the comparative nanocrystal of Comparative Example 1.

Evaluation Example 2

X-Ray Photoelectron Spectroscopy (XPS)

The substituted and comparative nanocrystals prepared in Example 1 and Comparative Example 1, respectively, were analyzed by X-ray photoelectron spectroscopy (XPS) using a PHI Quanterat II (available from ULVAC-PHI, Inc.). The analysis results are shown in FIGS. 3A to 3D.

Referring to FIGS. 3A to 3D, the substituted nanocrystal of Example 1 was found to exhibit different XPS characteristics compared with those of the comparative nanocrystal of Comparative Example 1.

Evaluation Example 3

Emission Spectrum

1) Example 1 and Comparative Example 1

Absorbance characteristics of the substituted and comparative nanocrystals prepared in Example 1 and Comparative Example 1, respectively, were analyzed. The results are shown in FIG. 4.

Figure 4:
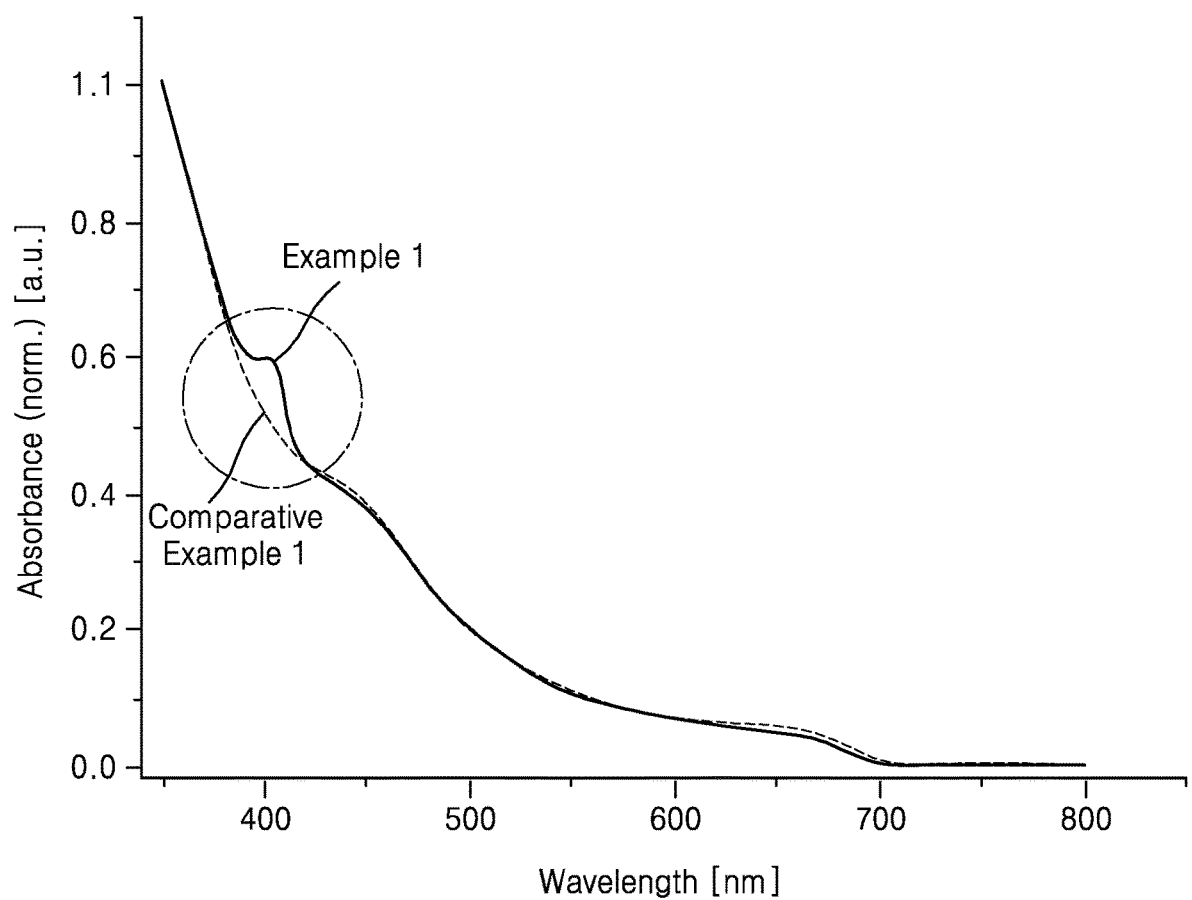
FIG. 4 is a graph of normalized absorbance (a.u.) versus wavelength (nanometers, nm) for the nanocrystals of Example 1 and Comparative Example 1.

Referring to FIG. 4, the substituted nanocrystal of Example 1 was found to have absorbance characteristics distinctly different from those of the comparative nanocrystal of Comparative Example 1.

Emission spectra of the substituted and comparative nanocrystals of Example 1 and Comparative Example 1, respectively, were each analyzed with light having a wavelength ($\lambda_{EX}$) of about 430 nanometers (nm) and light having a wavelength ($\lambda_{EX}$) of about 540 nm as excitation sources. The resulting photoluminescence spectra are shown in FIGS. 5 and 6.

Figure 5:
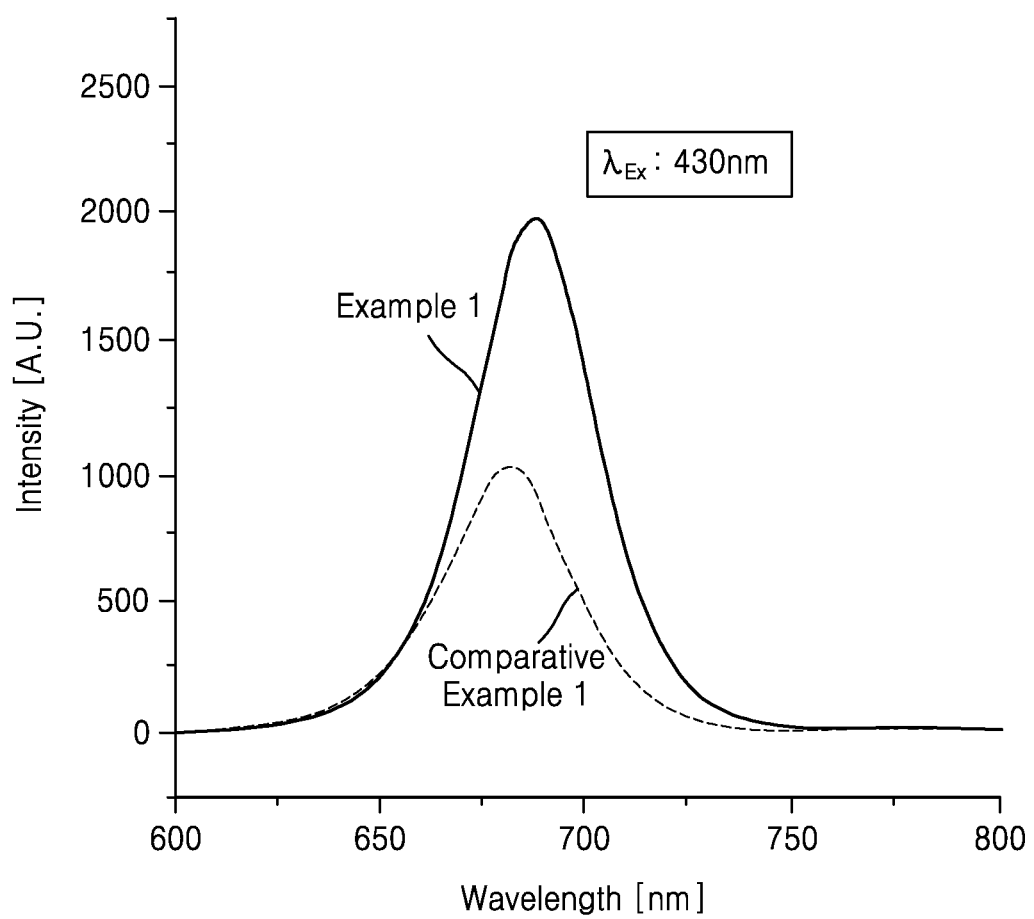
FIGS. 5 and 6 are graphs of intensity (a.u.) versus wavelength (nm) and show emission spectra of the nanocrystals of Example 1 and Comparative Example 1.
Figure 6:
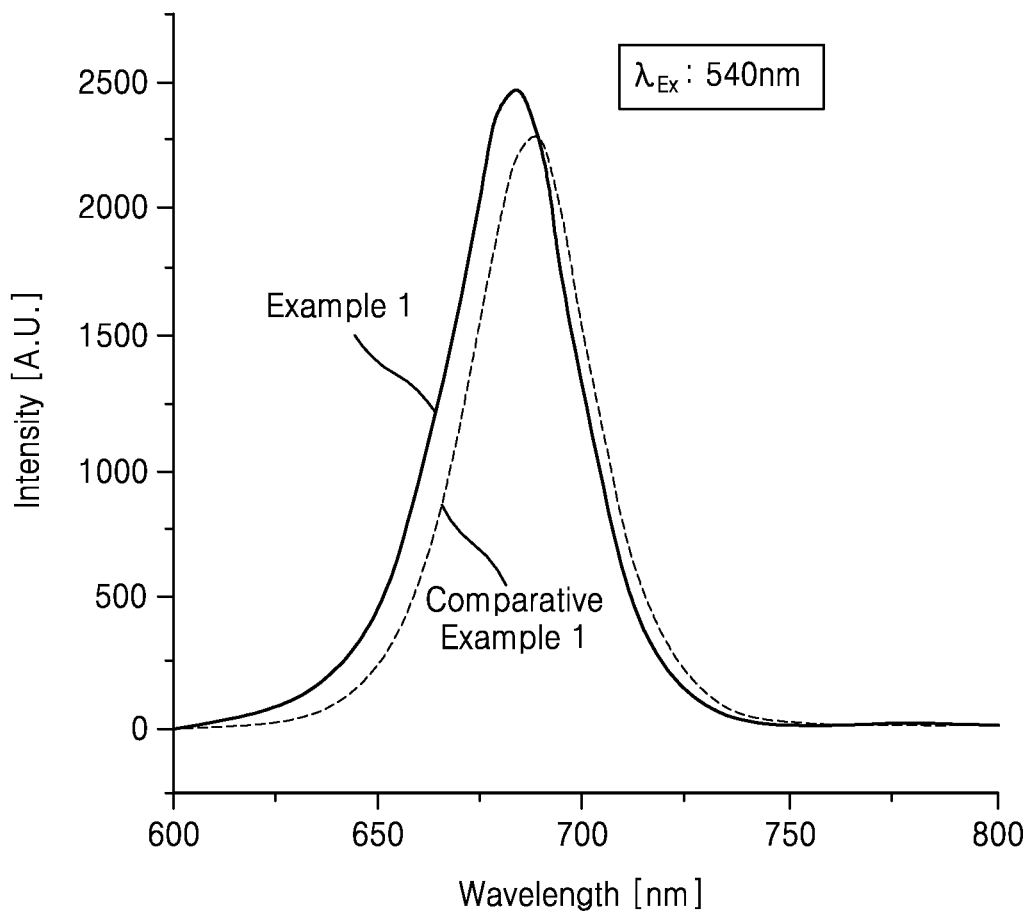

Referring to FIGS. 5 and 6, the substituted nanocrystal of Example 1 was found to have similar emission characteristics to those of the comparative nanocrystal of Comparative Example 1.

When light having a wavelength ($\lambda_{EX}$) of about 540 nm was used, the substituted nanocrystal of Example 1 exhibited a maximum emission wavelength of about 668 nm, while the comparative nanocrystal of Comparative Example 1 exhibited a maximum emission wavelength of about 676 nm, meaning that the emission wavelengths of the two nanocrystal samples were different by 8 nm. A maximum emission wavelength refers to an emission wavelength with a maximum peak intensity. A peak intensity of the nanocrystal of substituted Example 1 was 1.1 times greater than that of the comparative nanocrystal of Comparative Example 1.

2) Comparative Example 3

Emission spectra of the nanocrystal blend prepared in Comparative Example 3 were analyzed.

Red emission of $CsPbI_3$ and blue emission of $CsPbCl_3$ appeared intermixed in the emission spectra of the nanocrystal blend of Comparative Example 3. Such spectroscopic changes were observed in the emission spectra of the nanocrystal blend of Comparative Example 3 as a simple blend.

Comparing such emission spectra of the nanocrystal blend of Comparative Example 3 with the emission spectra of the substituted nanocrystal of Example 1 shown in FIGS. 5 and 6, the emission spectra of the substituted nanocrystal of Example 1 appeared different from those of the nanocrystal blend of Comparative Example 3, indicating that the substituted nanocrystal of Example 1 had a distinctive structure in which a portion of the iodide anions in the outermost region of the substituted nanocrystal were substituted with chloride ions.

As described above, according to the one or more embodiments, a substituted nanocrystal including a nanocrystal represented by Formula 1 may have improved stability, even when in the form of colloid perovskite quantum dots. An optoelectronic device with improved performance may be manufactured using the substituted nanocrystal.

It should be understood that embodiments described herein should be considered in a descriptive sense and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. An optoelectronic device comprising:
a substituted nanocrystal comprising a nanocrystal represented by Formula 1, wherein a portion of halogen atoms in an outermost region of the nanocrystal is substituted with an anion, the anion comprising a chloride anion, a polyatomic anion, or a combination thereof $$AMX_3 \quad \text{Formula 1}$$

wherein, in Formula 1,
A is cesium, rubidium, or an ammonium salt;
M is germanium, tin, or lead; and
X is iodine or bromine, and
wherein an amount of the anion is about 0.55 weight percent or less, based on a total weight of the substituted nanocrystal.

2. The optoelectronic device of claim 1, wherein the portion of halogen atoms in the outermost region of the nanocrystal is substituted with the polyatomic anion, and wherein the polyatomic anion is $S_2O_3^{2-}$, $NO_3^-$, $H(PO_4)_2^-$, $H_2PO_4^-$, or a combination thereof.

3. The optoelectronic device of claim 1, wherein the nanocrystal represented by Formula 1 is a compound represented by Formula 2:

$$AMI_3 \quad \text{Formula 2}$$

wherein, in Formula 2,
A is cesium, rubidium, or an ammonium salt; and
M is germanium, tin, or lead.

4. The optoelectronic device of claim 1, wherein the nanocrystal represented by Formula 1 is $CsGeI_3$, $CsSnI_3$, or $CsPbI_3$.

5. The optoelectronic device of claim 1, wherein the substituted nanocrystal is represented by one of Formulae 3 to 6:

$$CsPbI_xCl_{3-x} \quad \text{Formula 3}$$

wherein, in Formula 3, $2.94 \leq x < 3$, $$CsPbI_x(SO_3)_{3-x} \quad \text{Formula 4}$$

wherein, in Formula 4, $2.94 \leq x < 3$, $$CsPbI_x(H(PO_4)_2)_{3-x} \quad \text{Formula 5}$$

wherein, in Formula 5, $2.94 \leq x < 3$, $$CsPbI_x(H_2PO_4)_{3-x} \quad \text{Formula 6}$$

wherein, in Formula 6, $2.94 \leq x < 3$, or a combination thereof.

6. The optoelectronic device of claim 1, wherein the anion is the chloride anion.

7. The optoelectronic device of claim 1, wherein the nanocrystal represented by Formula 1 is $CsPbI_3$, and a portion of iodide anions in an outermost region of $CsPbI_3$ is substituted with the chloride anion.

8. The optoelectronic device of claim 1, wherein the substituted nanocrystal has an emission wavelength of about 600 nanometers to about 750 nanometers.

9. The optoelectronic device of claim 1, wherein an amount of the anion is in a range of about 0.00001 weight percent to about 0.5 weight percent, based on a total weight of the substituted nanocrystal.

10. The optoelectronic device of claim 1, wherein the substituted nanocrystal is in a form of a colloidal perovskite quantum dot.

11. A method of preparing the substituted nanocrystal of the optoelectronic device of claim 1, the method comprising:
mixing the nanocrystal represented by Formula 1, a nonpolar organic solvent, and an inorganic salt comprising an anion, the anion comprising a chloride anion, a polyatomic anion, or a combination thereof to prepare a substituted nanocrystal; and
obtaining the substituted nanocrystal, wherein the substituted nanocrystal is of Formula 1

$$AMX_3 \quad \text{Formula 1}$$

wherein, in Formula 1,
A is cesium, rubidium, or an ammonium salt;
M is germanium, tin, or lead; and
X is iodine or bromine, and
wherein an amount of the anion is about 0.55 weight percent or less, based on a total weight of the substituted nanocrystal.

12. The method of claim 11, wherein the inorganic salt is a compound comprising a chloride, $S_2O_3^{2-}$, $NO_3^-$, $H(PO_4)_2^-$, $H_2PO_4^-$, or a combination thereof; and an alkali metal cation, a Group 12 metal cation, or a combination thereof.

13. The method of claim 11, wherein the inorganic salt is LiCl, $Na_2SO_4$, NaCl, $NaNO_3$, $Na_2S_2O_3$, $NaH(PO_4)_2$, $NaH_2PO_4$, $ZnCl_2$, or a combination thereof.

14. The method of claim 11, wherein an amount of the inorganic salt is about 0.5 parts by weight or less, based on 100 parts by weight of the nanocrystal represented by Formula 1.

15. The method of claim 11, wherein an amount of the inorganic salt is in a range of about 0.0000001 weight percent to about 2 weight percent, based on a total weight of the nonpolar organic solvent and the inorganic salt.

16. The method of claim 11, wherein the nonpolar organic solvent is pentane, hexane, heptane, isooctane, cyclohexane, toluene, benzene, xylene, N,N-dimethylformamide, or a combination thereof.

17. The method of claim 11, wherein the mixing of the nanocrystal represented by Formula 1, the nonpolar organic solvent, and the inorganic salt comprises:
- mixing the nonpolar organic solvent and the inorganic salt to obtain an inorganic salt mixture; and
- contacting the nanocrystal represented by Formula 1 with the inorganic salt mixture.

18. The method of claim 11, wherein the substituted nanocrystal is represented by one of Formulae 3 to 6:

$$CsPbI_xCl_{3-x} \qquad \text{Formula 3}$$

wherein, in Formula 3, $2.94 \leq x < 3$, $$CsPbI_x(SO_3)_{3-x} \qquad \text{Formula 4}$$

wherein, in Formula 4, $2.94 \leq x < 3$, $$CsPbI_x(H(PO_4)_2)_{3-x} \qquad \text{Formula 5}$$

wherein, in Formula 5, $2.94 \leq x < 3$, $$CsPbI_x(H_2PO_4)_{3-x} \qquad \text{Formula 6}$$

wherein, in Formula 6, $2.94 \leq x < 3$, or
a combination thereof.

19. The method of claim 11, wherein the nanocrystal represented by Formula 1 is $CsPbI_3$, and a portion of iodide anions in an outermost region of $CsPbI_3$ is substituted with the chloride anion to form the substituted nanocrystal; and
wherein the inorganic salt comprises NaCl, KCl, or a combination thereof.

20. The method of claim 19, wherein an amount of the chloride anion in the substituted nanocrystal is in a range of about 0.00001 weight percent to about 0.5 weight percent, based on a total weight of the substituted nanocrystal.

* * * * *